US012460628B2

(12) United States Patent
Snels

(10) Patent No.: US 12,460,628 B2
(45) Date of Patent: Nov. 4, 2025

(54) METHOD FOR CONTROLLING A COMPRESSOR WHICH PROVIDES THE DRIVE OF A PNEUMATIC TOOL

(71) Applicant: ATLAS COPCO AIRPOWER, NAAMLOZE VENNOOTSCHAP, Wilrijk (BE)

(72) Inventor: Guy Snels, Wilrijk (BE)

(73) Assignee: ATLAS COPCO AIRPOWER, NAAMLOZE VENNOOTSCHAP, Wilrijk (BE)

( * ) Notice: Subject to any disclaimer, the term of this patent is extended or adjusted under 35 U.S.C. 154(b) by 139 days.

(21) Appl. No.: 18/274,000

(22) PCT Filed: Mar. 14, 2022

(86) PCT No.: PCT/EP2022/056457

§ 371 (c)(1),
(2) Date: Jul. 25, 2023

(87) PCT Pub. No.: WO2022/200092

PCT Pub. Date: Sep. 29, 2022

(65) Prior Publication Data

US 2024/0410357 A1 Dec. 12, 2024

(30) Foreign Application Priority Data

Mar. 22, 2021 (BE) .................................. 2021/5213

(51) Int. Cl.
*F04B 49/08* (2006.01)
*B25D 9/08* (2006.01)
(Continued)

(52) U.S. Cl.
CPC ................ *F04B 49/08* (2013.01); *B25D 9/08* (2013.01); *E21B 4/14* (2013.01); *E21B 44/06* (2013.01); *F04B 2207/0421* (2013.01)

(58) Field of Classification Search
CPC .................. F04B 49/08; F04B 2205/09; F04B 2207/0421; B25D 9/08; E21B 4/14; E21B 44/06
See application file for complete search history.

(56) References Cited

U.S. PATENT DOCUMENTS 2,361,870 A * 10/1944 Rhoads .................. F04B 35/06 417/23
4,275,793 A * 6/1981 Schivley, Jr. ........... E21B 44/06 91/1

(Continued)

FOREIGN PATENT DOCUMENTS

FR 842667 A 6/1939
WO WO-2008115113 A1 * 9/2008 ............. E21B 44/06

(Continued)

OTHER PUBLICATIONS

International Search Report and Written Opinion in corresponding PCT Application No. PCT/EP2022/056457, dated May 11, 2022.

(Continued)

*Primary Examiner* — Nathan C Zollinger
(74) *Attorney, Agent, or Firm* — BACON & THOMAS, PLLC

(57) ABSTRACT

Method for controlling a compressor which drives a pneumatic tool, with a maximum allowed pressure (p_max) and an associated compressed air consumption (q_max). The method includes the step of regulating the operating pressure (p_compr) of the compressor, and: if the operating pressure (p_compr) is lower than p_max minus a value (Z), controlling the compressor such that the flow rate supplied by the compressor is not limited; and if the operating pressure (p_compr) is higher than or equal to p_max, controlling the compressor such that the flow rate supplied by the compressor does not exceed the compressed air consumption (q_max) at p_max; and if the operating pressure (p_compr)

(Continued)

is higher than p_max minus the value (Z) and is lower than p_max, controlling the compressor such that the operating pressure (p_compr) remains lower than p_max.

10 Claims, 2 Drawing Sheets

(51) Int. Cl.
*E21B 4/14* (2006.01)
*E21B 44/06* (2006.01)

(56) References Cited

U.S. PATENT DOCUMENTS 4,653,593 A * 3/1987 Lindberg ................ E21B 34/08 173/4
6,209,661 B1 * 4/2001 Muona .................... E21B 44/06 175/25
6,419,031 B1 * 7/2002 Poysti ..................... E21B 44/00 175/26
12,025,119 B2 * 7/2024 Snels ...................... F04B 49/08
2014/0360783 A1 12/2014 Lyon

FOREIGN PATENT DOCUMENTS

WO 2010041774 A1 4/2010
WO WO-2012026875 A1 * 3/2012 ............. E21B 21/16

OTHER PUBLICATIONS

BE Search Report in corresponding BE Application No. 202105213, dated Dec. 3, 2021.

* cited by examiner

METHOD FOR CONTROLLING A COMPRESSOR WHICH PROVIDES THE DRIVE OF A PNEUMATIC TOOL

BACKGROUND OF THE INVENTION

More specifically, the invention is intended for controlling a compressor which is part of a pneumatic drilling device, which further comprises a drilling tower and a drilling rod with a pneumatic tool, in particular a drilling hammer, but the method is not limited thereto.

In what follows, drilling tower is also understood to mean a mobile device, undercarriage or the like on which the drilling rod and other parts of the drilling device are placed.

It is known that such drilling devices are used for, inter alia, groundwater well drilling or geothermal drilling.

In this case, the drilling rod is driven into the ground or subsoil with the drilling hammer to form a borehole in the ground.

Using the compressed air supplied by the compressor, the drilling hammer will perform a knocking or reciprocating motion in the ground. The drilling tower will exert a force on the drilling rod and drilling hammer and causing them to rotate.

The power of the drilling hammer when performing this knocking motion, and the resulting drilling speed, depends on the pressure of the compressed air.

The compressed air originating from the compressor will flow through the drilling device up to the drilling hammer. Herewith, pressure losses will occur, such that the pressure supplied by the compressor will not be the pressure at the location of the drilling hammer.

During drilling, at certain times the drilling device will be stopped, to disconnect the drilling rod, add an additional portion of the drilling rod to extend the drilling rod to allow drilling deeper into the ground. Extending the drilling rod will be accompanied by additional pressure losses.

As a result, one can never know what the exact pressure of the compressed air is at the location of the drilling hammer.

The drilling hammer always has a certain maximum pressure of the compressed air for which it is suitable.

To avoid damage to the drilling hammer, which is a very expensive part of the drilling tower, care must be taken to ensure that the drilling hammer is not exposed to a higher compressed air pressure than what it is designed for.

In the known drilling towers, therefore, either the hammer is selected as a function of the maximum pressure supplied by the compressor or the operating pressure set point of the compressor is equated to the maximum pressure of the drilling hammer.

Such known drilling towers therefore have the drawback that, as a result of said pressure losses, the pressure of the compressed air at the location of the drilling hammer will always be lower than this maximum pressure, such that the drilling hammer will never operate at its optimum power or drilling speed.

The deeper the drilling and the longer the drilling rod, the greater these pressure losses will become. Any groundwater that accumulates in the wellbore also contributes to these pressure losses.

A disadvantage is that, when there are many pressure losses, the force the drilling hammer will exert will be far below the maximum possible force, such that the drilling speed will be far from optimal. These pressure losses can increase to such an extent that from a given depth it is not economically viable to drill deeper.

A similar problem also arises with other pneumatic tools which are driven by a compressor.

SUMMARY OF THE INVENTION

The present invention aims to provide a solution to at least one of said and other drawbacks.

The present invention has as its object a method which is an addition to the existing control of a compressor, which provides the drive of a pneumatic tool, wherein the pneumatic tool has a maximum allowed pressure p_max and an associated compressed air consumption q_max.

To this end, the invention relates to a method for controlling a compressor which provides the drive of a pneumatic tool, the pneumatic tool having a maximum allowed pressure p_max and an associated compressed air consumption q_max, the method comprising the basic step of regulating the operating pressure p_compr of the compressor, characterized in that the method comprises the following steps:

- if the operating pressure p_compr of the compressor is lower than the maximum allowed pressure p_max of the pneumatic tool minus a predetermined value: controlling the compressor according to said basic step wherein the flow rate supplied by the compressor is not limited by the method;
- if the operating pressure p_compr of the compressor is higher than or equal to the maximum allowed pressure p_max of the pneumatic tool: controlling the compressor according to said basic step wherein the flow rate supplied by the compressor does not exceed the compressed air consumption q_max of the pneumatic tool at the maximum allowed pressure p_max;
- if the operating pressure p_compr of the compressor is higher than the maximum allowed pressure p_max of the pneumatic tool minus the predetermined value and is lower than the maximum allowed pressure p_max of the pneumatic tool: controlling the compressor according to said basic step wherein the operating pressure p_compr of the compressor remains lower than the maximum allowed pressure p_max of the pneumatic tool.

The already known regulation, i.e. said basic step, consists of the fact that the operating pressure of the compressor is always regulated to the operating pressure set point, for example set by the customer, i.e. said desired operating pressure p_set.

In order for the operating pressure of the compressor (p_compr) to reach this set operating pressure set point (p_set), the regulation will be able to change the flow rate supplied by the compressor by acting on:

- the rotational speed of the compressor. A lower rotational speed will lead to a lower flow rate and vice versa;
- the throttling of an inlet valve mounted in front of the compressor element. More throttling will lead to a lower flow rate and vice versa.

The regulation will decrease the flow rate supplied by the compressor when the operating pressure is higher than p_set and increase when the operating pressure is lower than p_set. The regulation evolves towards an equilibrium situation wherein the flow rate supplied by the compressor maintains the operating pressure of the compressor (p_compr) at a value equal to the operating pressure set point p_set, set by the customer.

The flow rate supplied by the compressor is limited and may depend on the pressure in the pressure vessel. At lower operating pressures, the maximum flow rate may be higher than at higher operating pressures.

Said basic step may also consist of regulating the operating pressure p_compr of the compressor such that the compressor will supply a flow rate as long as the operating pressure p_compr of the compressor is lower than a desired operating pressure p_set. Subsequently, the compressor will no longer supply a flow rate until the operating pressure decreases to a certain value below the desired operating pressure p_set.

In addition to this known regulation, the method according to the invention comprises steps or conditions as set forth above.

The maximum allowed pressure p_max of the pneumatic tool is the maximum pressure of the compressed air to which the pneumatic tool may be exposed, in order to be able to guarantee the structural integrity of the pneumatic tool.

At this pressure p_max, the pneumatic tool will consume a certain flow rate q_max of compressed air. Both the pressure p_max and the flow rate q_max are known and are specified by the manufacturer of the pneumatic tool. Conversely, when the pneumatic tool consumes the compressed air flow rate q_max, the pressure over the pneumatic tool will be p_max.

The operating pressure p_compr of the compressor is the pressure of the compressed air supplied by the compressor. In most cases, the compressor is provided with a pressure vessel in which the compressed air from the compressor is stored and which serves as a kind of buffer. The pressure in the pressure vessel is then considered to be said operating pressure of the compressor.

An advantage of a method according to the invention is that the pressure over the pneumatic tool will never exceed p_max, even if the operating pressure of the compressor is higher than p_max, by limiting the supplied flow rate.

Moreover, in this way the pressure p_max will always be maintained over the pneumatic tool when the compressor has a higher operating pressure than p_max.

As a result, the pressure losses occurring in the device to which the pneumatic tool is coupled, can be absorbed, without the risk of the pressure over the pneumatic tool becoming higher than p_max.

The pneumatic tool will thus be able to operate at its optimum power and speed.

Another advantage is that at operating pressures of the compressor lower than p_max, the compressed air flow rate supplied by the compressor can and may be higher than q_max.

This can assist in repressurizing the pneumatic tool more quickly after disconnecting the pneumatic tool.

Preferably, the method comprises the step of:

if the operating pressure p_compr of the compressor is higher than the maximum allowed pressure p_max of the pneumatic tool minus a predetermined value and lower than the maximum allowed pressure p_max of the pneumatic tool: controlling the compressor such that the supplied flow rate of compressed air of the compressor decreases with increasing operating pressure of the compressor, such that when the operating pressure of the compressor is equal to the maximum allowed pressure p_max of the pneumatic tool, the supplied flow rate of compressed air of the compressor is equal to the associated compressed air consumption q_max of the pneumatic tool at the maximum allowed pressure p_max of the pneumatic tool.

An advantage is that by such regulation it is ensured that the pressure over the pneumatic tool can never exceed p_max, and that simultaneously the flow rate of the compressor is as large as possible.

Preferably, the method comprises the following step:

if the operating pressure p_compr of the compressor is higher than the maximum allowed pressure p_max of the pneumatic tool minus the predetermined value and is lower than the maximum allowed pressure p_max of the pneumatic tool, the flow rate q_compr of the compressed air of the compressor will not decrease with increasing operating pressure p_compr of the compressor.

More particularly, the method preferably comprises the following step:

if the operating pressure p_compr of the compressor is higher than the maximum allowed pressure p_max of the pneumatic tool minus the predetermined value and is lower than the maximum allowed pressure p_max of the pneumatic tool, the flow rate q_compr of the compressed air of the compressor is reduced as a function of the operating pressure p_compr of the compressor according to a linear relationship.

Said predetermined value is a margin that is chosen on the basis of the necessary certainty or safety that is required, and amounts to, for example, 0.1 bar. Preferably, this value is comprised between 0.05 bar and 0.5 bar. However, it cannot be ruled out that the value is 0 or more than 0.5 bar.

The invention further relates to a pneumatic tool driven by a compressor, the pneumatic tool having a maximum allowed pressure p_max and an associated compressed air consumption q_max, characterized in that the compressor is provided to be controlled according to a method according to the invention.

The invention also relates to a pneumatic drilling device, which is provided with a drilling tower, a drilling rod with a drilling hammer and a compressor which provides the drive of the drilling hammer, wherein the drilling hammer has a maximum allowed pressure p_max and associated compressed air consumption q_max, characterized in that that the compressor is provided to be controlled according to a method according to the invention.

The invention also relates to a control unit for controlling a compressor, characterized in that the control unit can perform the method according to the invention.

BRIEF DESCRIPTION OF THE DRAWINGS

In order to better demonstrate the features of the invention, some preferred applications of the method for controlling a compressor which drives a pneumatic tool according to the invention are described below, by way of example without any limiting character, with reference to the accompanying drawings, in which.

DETAILED DESCRIPTION OF THE INVENTION

In what follows, the invention is described in more detail by way of example and without limitation with reference to a pneumatic drilling device 1 with a pneumatic hammer 5. However, the invention is not limited thereto and is applicable to any pneumatic tool.

Figure 1:
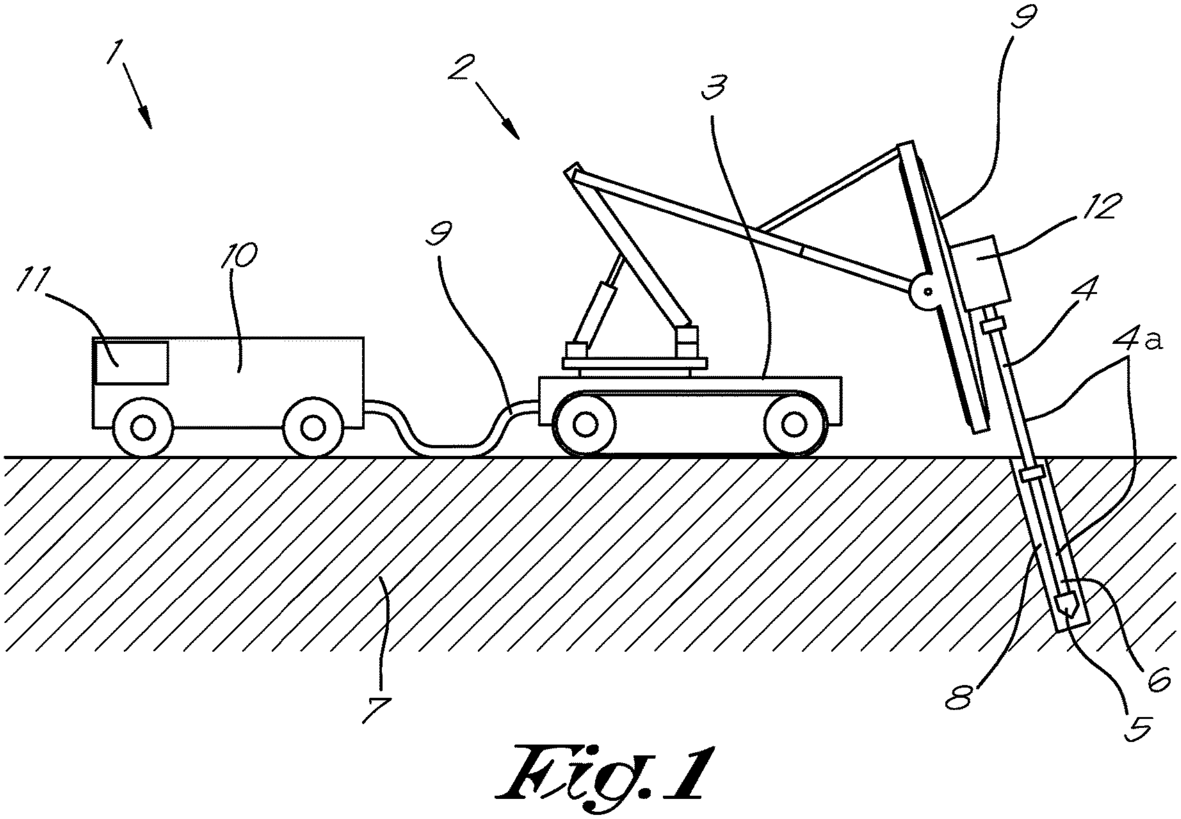
FIG. 1 schematically represents a mobile pneumatic drilling device.

FIG. 1 schematically shows a mobile pneumatic drilling device 1.

The pneumatic drilling device 1 is provided with a drilling tower 2.

The drilling tower 2 is or comprises in this case, but not necessarily for the invention, a mobile undercarriage 3.

The drilling tower 2 could also be a classical fixed or immovable drilling tower 2.

The drilling tower 2 is further provided with a drilling rod 4 with a drilling hammer 5 and a drive 12 for rotating the drilling rod 4 and drilling hammer 5.

The drilling rod 4 is mounted in the drilling tower 2, i.e. the drilling tower 2 supports the drilling rod 4.

The drilling rod is composed of different parts 4*a*.

The drilling hammer 5, which is mounted on one end 6 of the drilling rod 4, serves to be driven into the ground 7 or subsoil 7 to create a well 8, cavity 8, hole 8 or the like in this ground or subsoil.

This drilling hammer 5 has a maximum allowed pressure $p_{max}$.

This is the maximum pressure to which the drilling hammer 5 may be exposed.

At a pressure higher than this maximum allowed pressure $p_{max}$, the structural integrity of the drilling hammer 5 can no longer be guaranteed. Also, at such high pressures where the forces of the knocking drilling movements are much greater, the drilling hammer 5 will wear out faster.

When there is a pressure of $p_{max}$ over the drilling hammer 5, the drilling hammer 5 will have a associated compressed air consumption $q_{max}$.

Conversely, when the drilling hammer 5 has a compressed air consumption of $q_{max}$, the pressure over the drilling hammer 5 will be equal to $p_{max}$.

The specifications $p_{max}$ with associated $q_{max}$ are specified by the manufacturer of the drilling hammer 5.

The drilling tower 2 further also comprises all necessary tubes 9, pipes 9, hoses 9, connections 9 and the like to convey compressed air, or compressed air, from a compressor 10 to the drilling rod 4 with drilling hammer 5.

Said compressor 10 is also part of the drilling device 1 in the example shown.

Although it is shown in the figure in a separate mobile compressor 10, it cannot be ruled out that it is integrated in or forms part of the drilling tower 2.

The operation of the drilling device 1 for drilling a cavity 8 or well in the subsoil 7 is known and as follows.

The compressor 10 supplies compressed air, or compressed air, which is conveyed via the tubes 9, pipes 9, hoses 9, connections 9 and the like to the drilling rod 4 and thus to the drilling hammer 5.

Under the influence of this compressed air, the drilling hammer 5 will perform a knocking movement in the subsoil 7.

In addition to this knocking movement, the drilling hammer 5 also performs a rotational movement about the axis of the drilling rod 4.

This rotational movement of the drilling hammer 5 typically does not take place under the influence of the compressed air, but for this purpose, in most cases, a separate drive 12, such as for instance a motor, is provided.

Due to the knocking-rotating movement of the drilling hammer 5, it will, as it were, perform a drilling movement in the ground 7 or subsoil 7, such that a well 8, cavity 8, hole 8 or the like is created.

During this drilling, the drilling hammer 5 is driven ever deeper into the ground 7 or subsoil 7 in the well 8 thus created, cavity 8, hole 8 or the like.

At a certain moment, the drilling hammer 5 will no longer be able to go deeper, because the drilling rod 4 is not long enough.

At that moment, drilling is stopped. The drilling rod 4 is disconnected and an additional portion 4*a* of the drilling rod 4 is added to elongate the drilling rod 4.

Because the drilling rod 4 becomes longer, the drilling hammer 5 will be able to go deeper into the ground 7 or subsoil 7.

After the drilling rod 4 has been elongated, it is repressurized by allowing the compressor 10 to supply compressed air again.

As soon as a sufficiently high pressure has been reached in the drilling rod 4 and the rest of the drilling device 1, drilling is continued.

Figure 2:
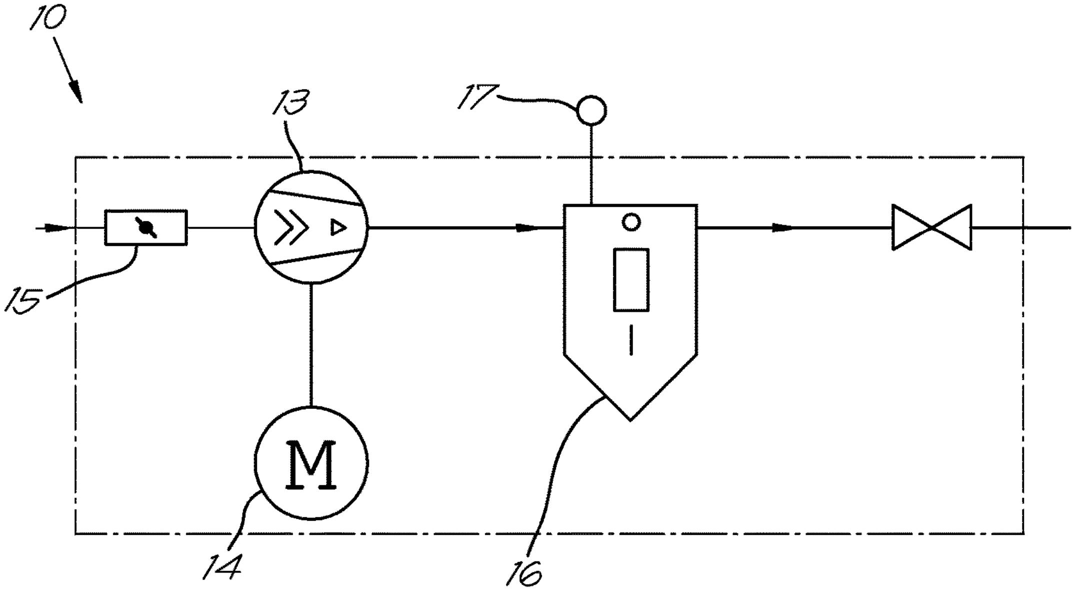
FIG. 2 schematically represents a possible embodiment of a compressor from FIG. 1.

In FIG. 2, a compressor 10 is schematically depicted. It shows that the compressor element 13 is driven by a motor 14. Note that the compressor element 13 can also be two or more compressor elements 13 arranged in series or parallel. By increasing the rotational speed of the motor 14, the flow rate supplied by the compressor 10 will increase. In this way the already known regulation can change the flow rate of the compressor 10.

A throttle valve 15 is mounted in front of the inlet of the compressor element 13. By closing it stepwise, the flow rate supplied by the compressor 10 can be reduced.

The compressed air or gas supplied by the compressor 10 is conveyed to a buffer vessel 16 on which a pressure sensor 17 is mounted. This pressure sensor 17 is used by the known regulation to compare the pressure $p_{comp}$ in the buffer vessel 16 with said desired operating pressure $p_{set}$ and to adjust the flow rate supplied by the compressor 10 to match $p_{compr}$ with $p_{set}$.

Figure 3:
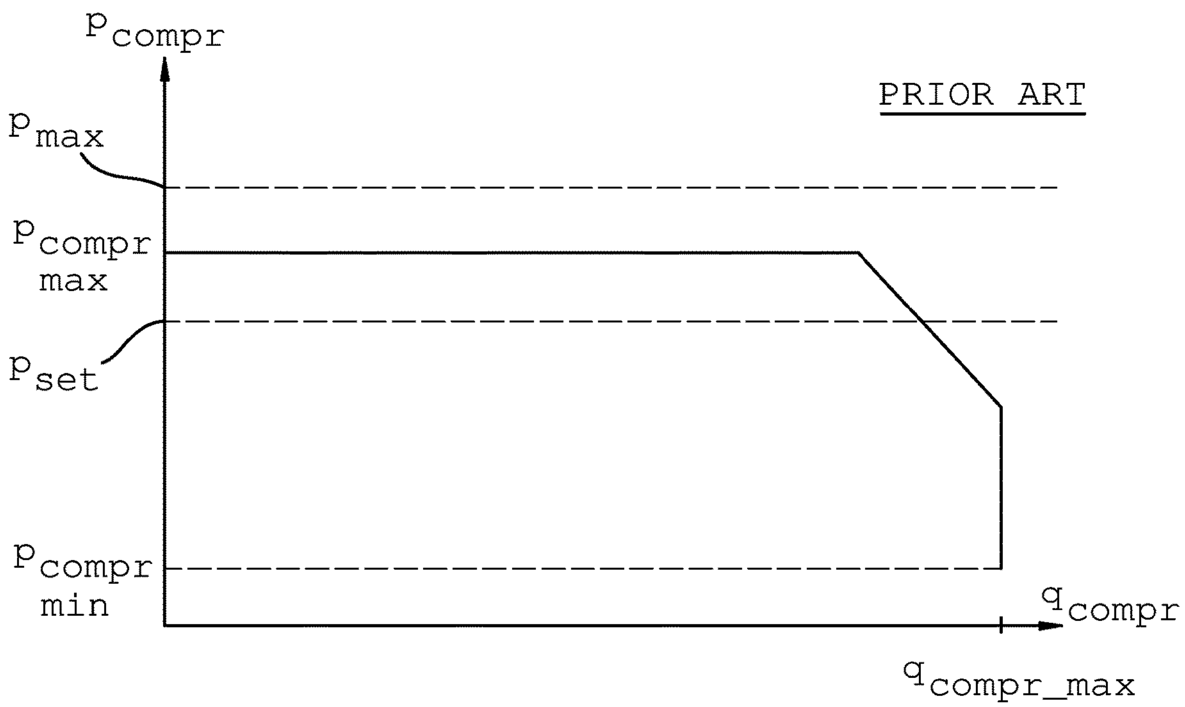
FIG. 3 schematically represents a known method for controlling a pneumatic drilling device.

The known method for controlling the drilling device 1 is schematically represented by the curve in FIG. 3.

Herewith, a compressor 10 will be selected which has a maximum operating pressure $p_{compr\_max}$. If this maximum operating pressure $p_{compr\_max}$ is higher than $p_{max}$, the operating pressure set point $p_{set}$ may be set at most to $p_{max}$.

When the compressor 10 is operated and the customer has set a operating pressure set point $p_{set}$, the compressor 10 will start supplying compressed air once the pressure is above a certain minimum value $p_{compr\_min}$.

At this pressure $p_{compr\_min}$, the compressor 10 will be able to supply its maximum flow rate $q_{compr\_max}$.

The compressor 10 will be able to supply this flow rate $q_{compr\_max}$ up to a certain pressure, from this moment on, the power supplied by the drive 11 of the compressor 10 becomes the limiting factor and the supplied flow rate will decrease with increasing operating pressure.

When the operating pressure $p_{compr}$ reaches the operating pressure set point $p_{set}$, the flow rate $q_{compr}$ will be regulated in such a way that an equilibrium situation occurs. The equilibrium means that the supplied flow rate results in a operating pressure $p_{compr}$ which is equal to $p_{set}$.

From this moment on, the flow rate $q_{compr}$ supplied by the compressor 10 will remain equal such that the operating pressure $p_{compr}$ of the compressor 10 is maintained at $p_{set}$.

The flow rate $q_{compr}$ that must be supplied will depend, among other things, on the chosen drilling hammer 5 and the set operating pressure set point $p_{set}$.

A consequence thereof is that the pressure to which the drilling hammer 5 is exposed can never be higher than $p_{max}$, since at least either $p_{set}$ or $p_{compr\_max}$ is smaller than this $p_{max}$, but also because the pressure to which the drilling hammer 5 is exposed will also be smaller than p_compr_max due to the pressure losses occurring in the drilling device 1.

When an additional portion 4*a* of the drilling rod 4 is added, the compressor 10 is set to no load and the pressure of the drilling rod 4 is released. Afterwards, the compressor 10 is loaded again and the system and the drilling rod 4 will be pressurized again, wherein again a first flow rate of q_compr_max at a pressure of p_compr_min is supplied and then the entire curve is traced again and finally the compressor 10 yields again its maximum pressure p_compr_max.

Figure 4:
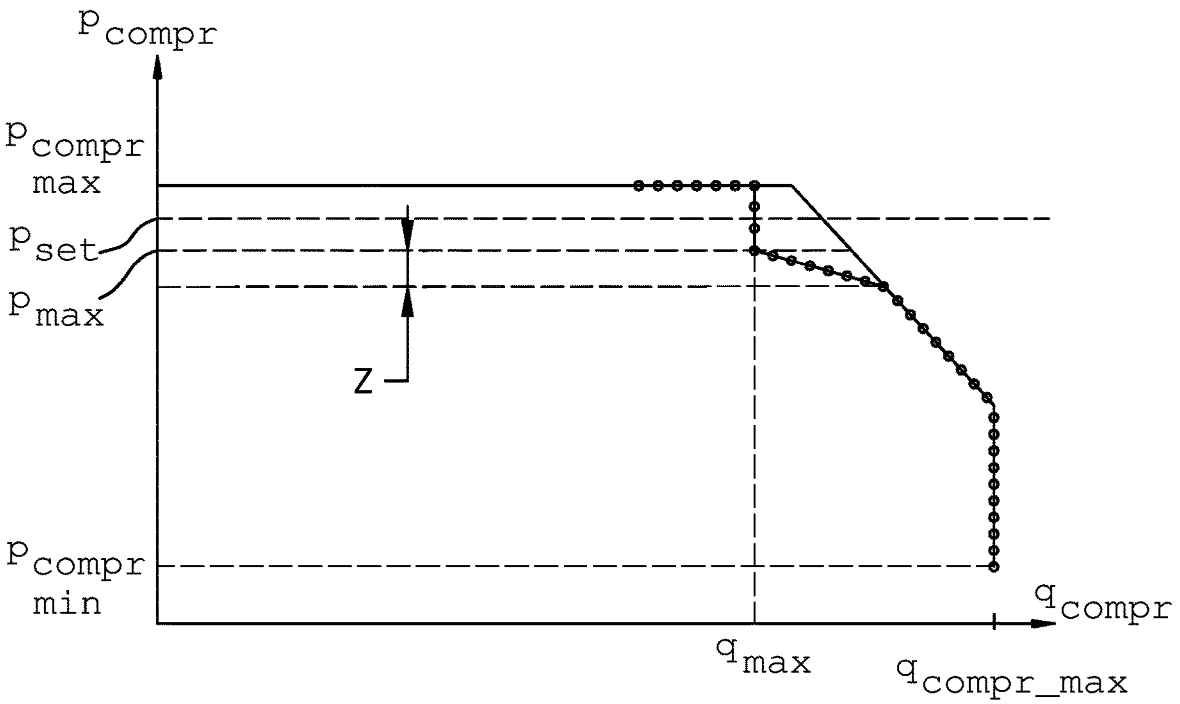
FIG. 4 schematically represents a method according to the invention for controlling a pneumatic drilling device.

FIG. 4 shows the method according to the invention for controlling the drilling device 1.

In this case, a compressor 10 is used which has a maximum operating pressure p_compr_max which is greater than the maximum allowed pressure p_max of the drilling hammer 5.

The line schematically represents a known method for controlling a pneumatic drilling device 1. Such a method results in the drilling hammer 5 being exposed to a higher pressure than p_max at flow rates higher than q_max.

The dotted line represents a method according to the invention.

The method implies that the compressor 10 will always try to equal the operating pressure p_compr of the compressor 10 to the operating pressure set point p_set. To achieve this, the regulation will adjust the flow rate supplied by the compressor 10. The method according to the invention implies that, in addition to this known regulation, the maximum supplied flow rate that the compressor 10 can supply is additionally limited under certain conditions.

As can be seen from this figure, as long as the operating pressure p_compr of the compressor 10 is lower than the operating pressure set point p_set and smaller than the maximum allowed pressure p_max of the drilling hammer 5 minus a predetermined value Z, the compressor 10 will be controlled such that the compressor 10 delivers its maximum flow rate possible at this operating pressure p_compr.

Said preset value Z is, for example, 0.5 bar.

The method according to the invention for operating pressures p_compr lower than the maximum allowed pressure p_max of the drilling hammer 5 minus a predetermined value Z, thus corresponds to the known methods for controlling the pneumatic drilling device 1.

When the operating pressure of the compressor 10 is higher than or equal to the maximum allowed pressure (p_max) of the drilling hammer 5, the compressor 10 will be controlled according to the known regulation albeit with the limitation that the compressed air flow rate supplied by the compressor 10 does not exceed the value q_max. q_max Is the compressed air consumption of the drilling hammer 5 when there is a pressure difference p_max over the drilling hammer 5.

The regulation of the compressor 10 will attempt to equate the operating pressure p_compr of the compressor 10 with the operating pressure set point P_set, provided that the compressed air flow rate supplied by the compressor 10 does not exceed the value q_max. Whether the regulation will be able to achieve this, will depend on the underlying process, i.e. the type of drilling hammer 5, the drilling process and will depend on, for example, the amount of groundwater in the drilled well 8 or cavity 8. If a compressed air flow rate equal to q_max is not sufficient for the operating pressure p_compr of the compressor 10 to reach the operating pressure set point p_set, the operating pressure p_compr of the compressor 10 will maintain a lower than desired level.

If the operating pressure p_compr of the compressor 10 is higher than the maximum allowed pressure p_max of the drilling hammer 5 minus the predetermined value Z, but is lower than the maximum allowed pressure p_max of the drilling hammer 5, the compressor 10 will be controlled according to the known regulation with the restriction that the flow rate supplied by the compressor 10 must not exceed:

1) q_max when the operating pressure p_compr of the compressor 10 is equal to said maximum allowed pressure p_max.
2) The maximum allowed flow rate by the known regulation at the maximum allowed pressure p_max of the drilling hammer 5 minus the predetermined value Z.
3) A value between the two extremes stated under the two previous points with the additional requirement that, when the operating pressure p_compr of the compressor 10 decreases, the maximum allowed flow rate may not decrease.

This ensures that, when the operating pressure p_compr of the compressor 10 approaches the maximum allowed pressure p_max of the drilling hammer 5, the regulation will deviate from the classically known regulation, such that the flow rate supplied by the compressor 10 may not be higher than q_max of the drilling hammer 5 as long as the operating pressure of the compressor 10 is higher than the maximum allowed pressure p_max of the drilling hammer 5.

In the illustrated example of FIG. 4, in this range the compressor 10 is controlled such that the supplied flow rate q_compr of compressed air of the compressor 10 decreases with increasing operating pressure p_compr of the compressor 10, such that when the operating pressure p_compr of the compressor 10 is equal to the maximum allowed pressure p_max of the drilling hammer 5, the supplied flow rate of compressed air from the compressor 10 is equal to the associated compressed air consumption q_max of the drilling hammer 5 at the maximum allowed pressure p_max of the drilling hammer 5.

In the example of FIG. 4, the reduction of the flow rate q_compr of compressed air as a function of the operating pressure p_compr of the compressor 10 takes place according to a linear relationship.

However, this is not necessary for the invention. This could also be a non-linear relationship.

Regulating the compressor 10 can be done in various ways, however preferably the supplied flow rate q_compr of the compressor 10 is regulated by regulating the rotational speed of the drive 11 of the compressor 10, and/or by regulating an inlet valve of the compressor 10.

However, the invention is not limited thereto.

Said inlet valve is, for example, a throttle valve which allows the inlet of the compressor 10 to be throttled.

It cannot be ruled out that the drilling device 1 is provided with a control unit for this regulation of the compressor 10 and in particular of the drive 11 and/or of the inlet valve.

Although the foregoing always refers to a pneumatic drilling device 1 provided with a pneumatic drilling hammer, the invention is not limited thereto and the method according to the invention can be used for any compressor which provides the drive for any pneumatic tool.

The present invention is by no means limited to the embodiments described by way of example and shown in the figures, but such a method for controlling a compressor which provides the drive of a pneumatic tool can be realized according to different variants without departing from the scope of the invention.

The invention claimed is:

1. A method for controlling a compressor which provides the drive of a pneumatic tool, the pneumatic tool having a maximum allowed pressure (p_max) and an associated compressed air consumption (q_max), the method comprising a basic step of regulating the operating pressure (p_compr) of the compressor by regulating the flow rate supplied by the compressor (q_compr), wherein the method further comprises the following steps:

if the operating pressure (p_compr) of the compressor is lower than the maximum allowed pressure (p_max) of the pneumatic tool minus a predetermined value (Z), controlling the compressor according to said basic step wherein the flow rate supplied by the compressor (q_compr) is not limited by the method;

if the operating pressure (p_compr) of the compressor is higher than or equal to the maximum allowed pressure (p_max) of the pneumatic tool, controlling the compressor according to said basic step wherein the flow rate supplied by the compressor (q_compr) does not exceed the compressed air consumption (q_max) of the pneumatic tool at the maximum allowed pressure (p_max);

if the predetermined value Z is greater than zero, the operating pressure (p_compr) of the compressor is higher than the maximum allowed pressure (p_max) of the pneumatic tool minus the predetermined value (Z), and the operating pressure (p_compr) is lower than the maximum allowed pressure (p_max) of the pneumatic tool, controlling the compressor according to said basic step wherein the operating pressure (p_compr) of the compressor remains lower than the maximum allowed pressure (p_max) of the pneumatic tool.

2. The method according to claim 1, wherein, if the operating pressure (p_compr) of the compressor is higher than the maximum allowed pressure (p_max) of the pneumatic tool minus the predetermined value (Z) and lower than the maximum allowed pressure (p_max) of the pneumatic tool, the flow rate (q_compr) of compressed air of the compressor will not decrease with increasing operating pressure (p_compr) of the compressor.

3. The method according to claim 2, wherein, if the operating pressure (p_compr) of the compressor is higher than the maximum allowed pressure (p_max) of the pneumatic tool minus the predetermined value (Z) and lower than the maximum allowed pressure (p_max) of the pneumatic tool, the flow rate (q_compr) of the compressed air of the compressor is reduced as a function of the operating pressure (p_compr) of the compressor according to a linear relationship.

4. The method according to claim 1, wherein, for regulating the flow rate supplied by the compressor (q_compr) of the compressor, the method comprises the following step(s):

regulating the rotational speed of a drive of the compressor; and/or regulating an inlet valve of the compressor.

5. The method according to claim 1, wherein the predetermined value (Z) is equal to 0.

6. The method according to claim 1, wherein the pneumatic tool is a pneumatic drilling hammer, which forms part of a pneumatic drilling device, which drilling device is provided with a drilling tower, a drilling rod with the drilling hammer coupled thereto, and wherein the compressor ensures the drive of the drilling hammer.

7. The method according to claim 1, wherein the basic step comprises the step of regulating the operating pressure (p_compr) of the compressor such that the operating pressure (p_compr) of the compressor is always regulated to a desired operating pressure (p_set).

8. The method according to claim 1, wherein the basic step comprises the step of regulating the operating pressure (p_compr) of the compressor such that the compressor will supply a flow rate as long as the operating pressure (p_compr) of the compressor is lower than a desired operating pressure (p_set), wherein, once the operating pressure (p_compr) of the compressor has reached the desired operating pressure (p_set), the compressor will no longer supply a flow rate until the operating pressure (p_compr) of the compressor decreases below a certain value which is lower than the desired operating pressure (p_set).

9. A pneumatic tool driven by a compressor, the pneumatic tool having a maximum allowed pressure (p_max) and an associated compressed air consumption (q_max), wherein the compressor is provided to be controlled by a method comprising a basic step of regulating the operating pressure (p_compr) of the compressor by regulating the flow rate supplied by the compressor (q_compr), wherein the method further comprises the following steps:

if the operating pressure (p_compr) of the compressor is lower than the maximum allowed pressure (p_max) of the pneumatic tool minus a predetermined value (Z) that is greater than zero, controlling the compressor according to said basic step wherein the flow rate supplied by the compressor (q_compr) is not limited by the method;

if the operating pressure (p_compr) of the compressor is higher than or equal to the maximum allowed pressure (p_max) of the pneumatic tool, controlling the compressor according to said basic step wherein the flow rate supplied by the compressor (q_compr) does not exceed the compressed air consumption (q_max) of the pneumatic tool at the maximum allowed pressure (p_max);

if the predetermined value Z is greater than zero, the operating pressure (p_compr) of the compressor is higher than the maximum allowed pressure (p_max) of the pneumatic tool minus the predetermined value (Z), and the operating pressure (p_compr) is lower than the maximum allowed pressure (p_max) of the pneumatic tool, controlling the compressor according to said basic step wherein the operating pressure (p_compr) of the compressor remains lower than the maximum allowed pressure (p_max) of the pneumatic tool.

10. A pneumatic drilling device, which drilling device is provided with a drilling tower, a drilling rod with a drilling hammer and a compressor which provides the drive of the drilling hammer, wherein the drilling hammer has a maximum allowed pressure (p_max) and an associated compressed air consumption (q_max), and wherein the compressor is provided to be controlled by a method comprising a basic step of regulating the operating pressure (p_compr) of the compressor by regulating the flow rate supplied by the compressor (q_compr), wherein the method further comprises the following steps:

if the operating pressure (p_compr) of the compressor is lower than the maximum allowed pressure (p_max) of the pneumatic tool minus a predetermined value (Z) that is greater than zero, controlling the compressor according to said basic step wherein the flow rate supplied by the compressor (q_compr) is not limited by the method;

if the operating pressure (p_compr) of the compressor is higher than or equal to the maximum allowed pressure (p_max) of the pneumatic tool, controlling the compressor according to said basic step wherein the flow rate supplied by the compressor ($q_{compr}$) does not exceed the compressed air consumption ($q_{max}$) of the pneumatic tool at the maximum allowed pressure ($p_{max}$);

if the predetermined value Z is greater than zero, the operating pressure ($p_{compr}$) of the compressor is higher than the maximum allowed pressure ($p_{max}$) of the pneumatic tool minus the predetermined value (Z), and the operating pressure ($p_{compr}$) is lower than the maximum allowed pressure ($p_{max}$) of the pneumatic tool, controlling the compressor according to said basic step wherein the operating pressure ($p_{compr}$) of the compressor remains lower than the maximum allowed pressure ($p_{max}$) of the pneumatic tool.

* * * * *